July 4, 1939.   J. M. CHRISTMAN   2,164,574
TOOL
Filed March 31, 1937
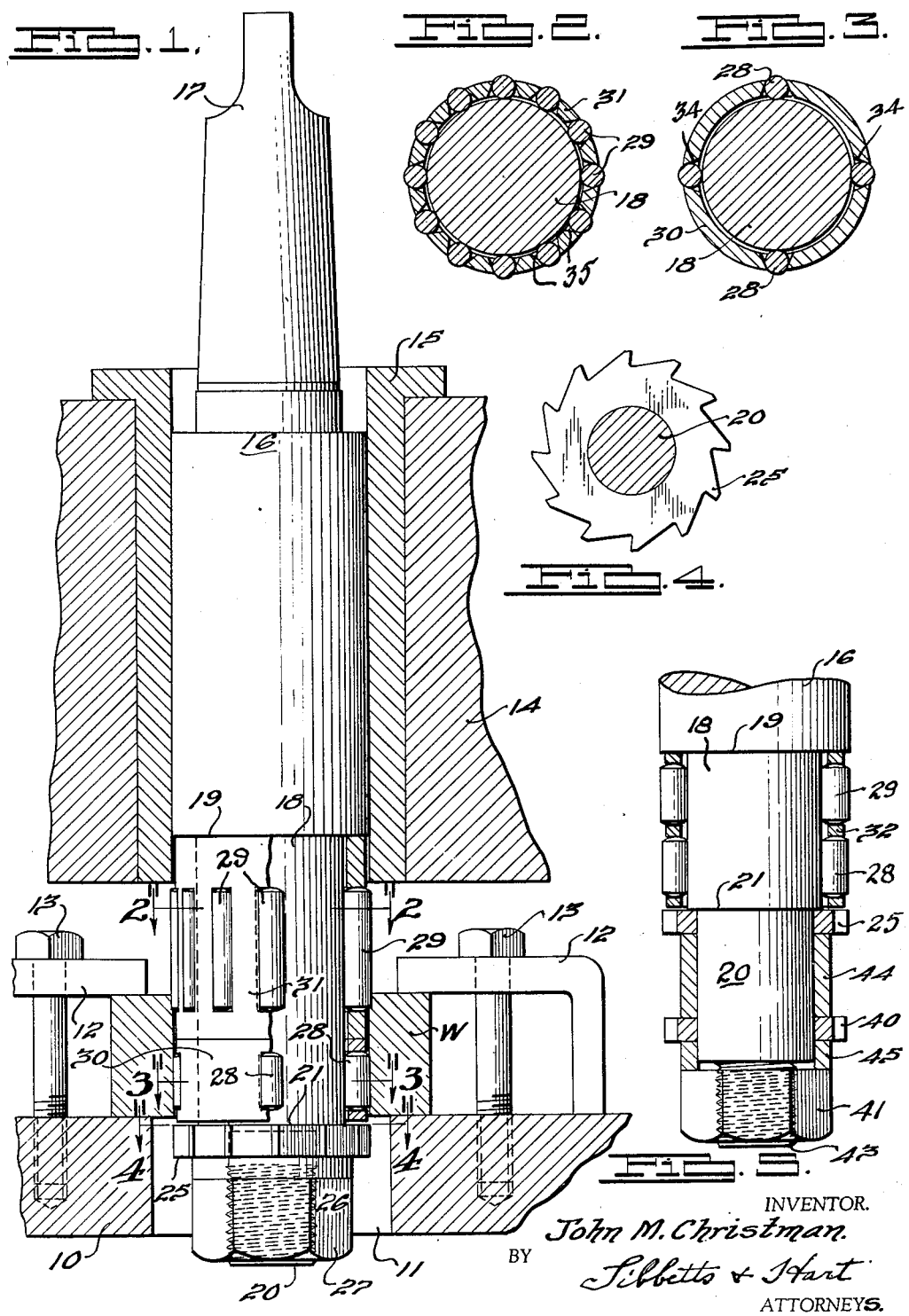
INVENTOR.
John M. Christman.
BY Sibbetts & Hart
ATTORNEYS.

Patented July 4, 1939

2,164,574

UNITED STATES PATENT OFFICE 2,164,574

TOOL

John M. Christman, Detroit, Mich., assignor to Packard Motor Car Company, Detroit, Mich., a corporation of Michigan Application March 31, 1937, Serial No. 134,120

5 Claims. (Cl. 29—90)

This invention relates to tools and more particularly to tools for forming circumferential surfaces.

Various types of tools are now employed for forming inner and outer circumferences of work pieces made of relatively hard material. In all cases it is customary to rotate either the work piece or the tool, and to feed one axially relative to the other. Such forming tools usually consist of a body having a plurality of circularly arranged teeth with end cutting edges. It has been the usual practice to relieve the teeth of such tools back of the cutting edges, but due to the cost of individual grinding of the relief for each tooth, such tools are being rapidly displaced by tools having cutting edges without relief, the latter type of tool forming the subject matter of my patent No. 2,087,231, issued July 20, 1937 and my application Serial No. 110,827, filed November 14, 1936.

Tools with relieved teeth leave ridges on surfaces formed thereby that must be removed by grinding or burnishing for most uses. Surfaces formed by tools of the character to which my previously mentioned applications relate are much less ridged than when the relieved teeth are used, but for some purposes a grinding or burnishing finishing operation on the work piece is required. A practical grinding or burnishing operation for finishing a surface is an additional operation and adds to the cost of the piece so treated.

It is an object of this invention to provide a tool that will accurately size and burnish a circumferential surface during the same operation.

Another object of the invention resides in the provision of a tool that will ream and burnish during a single operation.

A further object of the invention is to provide a tool for reaming and burnishing with bearing means for engaging the piece operated on intermediate the reaming and burnishing portions.

Still another object of the invention is to provide a tool in which a cutter and roller burnisher are carried by a holder to successively operate upon a piece of work during a single feeding operation.

Other objects of the invention will appear from the following description taken in connection with the drawing which form a part of this specification, and in which:

Fig. 1 is a view, partly in section, of a tool constructed in accordance with my invention shown in operating relation with a piece of work;

Fig. 2 is a sectional view of the tool taken on line 2—2 of Fig. 1 showing the burnishing means;

Fig. 3 is a sectional view of the tool taken on line 3—3 of Fig. 1 showing the bearing means;

Fig. 4 is a sectional view of the tool taken on line 4—4 of Fig. 1 showing the end of the cutter member;

Fig. 5 is a fragmentary view, partly in section, of a modified form of the invention having two cutter members of different diameter.

Referring now to the drawing by characters of reference, 10 indicates a supporting table upon which a bored work piece W is held. The table is formed with an opening 11 of larger diameter than the bore in the work piece but of less diameter than the work piece. The work piece is placed on the table with its bore in axial alignment with the table opening and is clamped in such position by jaws 12 and bolts 13.

A tool carrier 14 is associated with the supporting table and has a sleeve 15 in which a tool supporting bar 16 has a running fit for rotation and axial feeding movement. The supporting bar is held in axial alignment with the table opening 11 by the carrier sleeve and thus aligns with the bore or opening in the work piece. The following end of the tool supporting bar is formed with a driving shank 17 by which it may be rotated and moved endwise through the work piece.

The tool supporting bar is cylindrical in form forwardly of the driving shank and of several diameters. Directly forwardly of the bar portion having the running fit in the carrier sleeve is a reduced diameter portion 18 forming a shoulder 19, and ahead of the portion 18 of the bar is a still further reduced pilot portion 20 forming a shoulder 21. The leading end of this pilot portion is threaded in the embodiment of the invention shown in Fig. 1, while in the embodiment shown in Fig. 5 there is a threaded stem 43 extending forwardly from the pilot portion.

A disk cutter 25, of the reamer type shown in my Patent No. 2,087,231 having peripheral teeth 26 forming unrelieved cutting edges at their leading end, is piloted on the cylindrical portion 20 of the tool bar and is clamped in fixed relation against the shoulder 21.

Around the portion 18 of the bar, between the cutter 25 and the shoulder 19, is sleeve means carrying guide rollers 28 and burnishing rollers 29. As shown in Figs. 1 to 4 inclusive, the sleeve means comprises a pair of sleeve members 30 and 31 while in the modified embodiment of the invention shown in Fig. 5 the sleeve means consists of a single sleeve member 32. The sleeve means is of slightly less length than the distance between the shoulder 19 and the cutter in order to provide clearance in an axial direction and the internal diameter of the sleeve means is greater than the diameter of the portion of the supporting bar which it surrounds. The sleeve means is thus mounted on the supporting bar so that it is free to rotate and to move in an axial direction thereon.

The sleeve member 30 is formed with a plurality of longitudinally extending spaced slots 34 in which the rotatable guide rollers 28 are caged, these slots having their sides diverging inwardly and being of less width at the outer circumference of the sleeve than the diameter of the rollers. The rollers project partially through the slots and a circle defined by the outermost portion of the rollers is substantially the same diameter as and in axial alignment with the outer circumference of the cutter 25. These rollers are free to roll on the supporting bar and in the sleeve slots. They are arranged to follow into the bore in the work piece closely behind the cutter and provide a bearing that assists the carrier in maintaining the cutter on a definite axis throughout most of its effective operation.

The sleeve member 31 is provided with longitudinally extending spaced slots 35 for caging the burnishing rollers 29 in a definite relation. These slots are formed similar to slots 34, being of less width than the diameter of the rollers at the outer circumference of the sleeve member and having their sides diverging inwardly. These rollers 29 are free to rotate in the slots, against the supporting bar and the inner surface of the carrier sleeve and the diameter of the circle defined by the outermost portions thereof projecting through the slots is slightly larger than the diameter of the cutter. As these rollers follow the guide rollers through the bore made by the cutter, they will increase the diameter of the bore in the work piece and will roll in the work piece to form a smooth finished surface.

The sleeve 32 in Fig. 5 is formed with both of the sets of slots 34 and 35 for caging the rollers 28 and 29, respectively, in the same manner as that just described.

In the embodiment of the invention shown in Fig. 1, the cutter is fixed against the shoulder 21 of the supporting bar by a flanged nut 27 screwed upon the threaded end of the bar section 20. The cutter and shoulder 19 will serve to locate the sleeve means axially on the supporting bar.

Sometimes a single cutter is not capable of taking off the desired thickness of material from a work piece. Provision can be made for this condition, as shown in Fig. 5, by mounting a second cutter 40 on the pilot portion of the supporting bar. This cutter is of smaller diameter than the associated cutter and is first to engage the work piece. Between the two cutters is a spacing sleeve 44 that surrounds the pilot section of the supporting bar. Another sleeve 45 is mounted on the supporting bar in advance of cutter 40 and is engaged by the nut 41 when screwed on the stem 43. This nut is screwed up to tightly hold the cutters on the supporting bar through means of the sleeves 45 and 44 and the shoulder 19.

The running fit of the supporting bar with the carrier sleeve would allow slight movement of the cutter normal to the axial feed if this was the only support and the cutter could follow the bore in the work piece even though out of desired line. The cutter could, with such a mounting, slide the work piece laterally on the supporting base so that the reamed bore would be out of desired line. With the present tool, the location of bearing rollers directly behind the cutter prevents the cutter from shifting out of line or shifting the work out of position.

The guide rollers are located closely behind the cutter so that they will enter the reamed bore as quickly as possible. The burnishing rollers are preferably arranged to bear against the carrier sleeve during the first part of the cutting operation and thus form a guide for the tool until the rollers 28 enter the reamed bore in the work piece. In this manner there is no time during operation of the tool when the cutter can shift normal to its axis with the result that a true bore will be made. In addition to this, the piece of work will be sized and burnished during a single feeding movement of the tool. As the burnishing rollers are free to rotate during their effective operation, there will be no "snowballing" of the engaged material tending to produce an uneven finished surface.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A tool comprising a supporting bar, cutter means carried on the bar, burnishing means carried on the bar in rolling engagement therewith, and roller bearing means carried on the bar intermediate the cutter means and the burnishing means, said bearing roller means having a diameter corresponding to that of the bore formed by said cutter means.

2. A tool comprising a supporting bar, a cutter member fixed to one end of said bar, stop means on the bar, a slotted sleeve on the bar intermediate said cutter member and said stop means and having a limited axial movement therebetween, bearing rollers engaging the bar and projecting partially through slots in said sleeve behind said cutting member, and burnishing rollers engaging said bar and projecting partially through slots in said sleeve behind said bearing rollers.

3. Mechanism for reaming a piece of work held on a table comprising a carrier sleeve, an axially fed tool supporting bar having a running fit in said carrier sleeve, a disk cutter secured at the leading end of said bar, bearing rollers caged on said bar in close proximity to and following said cutter, the circle defined by said rollers being substantially the same as said cutter and less than the diameter of said sleeve, and burnishing rollers caged on said supporting bar behind said bearing rollers, said burnishing rollers defining a circle larger than the outer circumference of the cutter and substantially the same as the inner wall of the carrier sleeve, said burnishing rollers being arranged to bear against said sleeve until after said bearing rollers engage the surface formed in the work piece by the cutter.

4. A tool for changing the size of an opening in a work piece comprising a supporting bar, cutter means fixed to one end of the bar, burnishing means carried by the bar, and pilot means carried by the bar intermediate the cutter means and the burnishing means, said pilot means being adapted to engage in the work piece opening during a portion of the effective operation of both the cutter means and the burnishing means and between the effective operations of the cutter means and the burnishing means.

5. A reaming tool comprising a solid cylindrical supporting bar, a disk cutter having outer peripheral teeth, said disk cutter being fixed to said bar, and bearing rollers caged to bear on the bar adjacent the following end of the disk cutter, the circle described by the bearing rollers having the same diameter as the disk cutter.

JOHN M. CHRISTMAN.